(12) United States Patent
Tamura et al.

(10) Patent No.: US 7,552,794 B2
(45) Date of Patent: Jun. 30, 2009

(54) STEERING APPARATUS

(75) Inventors: Norifumi Tamura, Wako (JP);
Takamitsu Tajima, Wako (JP);
Yoshinobu Tada, Wako (JP); Koichi Suyama, Wako (JP); Shigeki Ehara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 372 days.

(21) Appl. No.: 11/386,919

(22) Filed: Mar. 22, 2006

(65) Prior Publication Data
US 2006/0214409 A1    Sep. 28, 2006

(30) Foreign Application Priority Data
Mar. 24, 2005   (JP)   ............... 2005-085892

(51) Int. Cl.
*B60K 26/00*   (2006.01)
(52) U.S. Cl. .................................................. 180/333
(58) Field of Classification Search ................ 280/315, 280/333, 771; 180/78, 315, 333; 74/479.01, 74/480 R, 484 R, 552
See application file for complete search history.

(56) References Cited

U.S. PATENT DOCUMENTS

| 2,707,109 | A | * | 4/1955 | Umstott | 280/774 |
| 2,889,714 | A | * | 6/1959 | Romano | 74/493 |
| 2,954,088 | A | * | 9/1960 | Williamson et al. | 180/20 |
| 4,568,104 | A | * | 2/1986 | LeBlanc | 280/771 |
| 4,815,331 | A | * | 3/1989 | Land | 74/494 |
| 5,086,870 | A | * | 2/1992 | Bolduc | 180/333 |
| 6,227,327 | B1 | * | 5/2001 | Nigrin et al. | 180/402 |
| 6,491,128 | B1 | * | 12/2002 | Lehmann et al. | 180/315 |
| 6,494,287 | B2 | * | 12/2002 | Nigrin et al. | 180/402 |

FOREIGN PATENT DOCUMENTS

JP    8-34353    2/1996

* cited by examiner

*Primary Examiner*—John Q. Nguyen
*Assistant Examiner*—Robert A. Coker
(74) *Attorney, Agent, or Firm*—Rankin, Hill & Clark LLP

(57) ABSTRACT

An input device 30A of an electric steering device 1 includes a pair of steering wheels 31A, 31B. When both the steering wheels 31A, 31B or one of the steering wheels 31A, 31B. is operated being rotated, front wheels 9 can be steered. Further, when both the steering wheels 31A, 31B or one of the steering wheels 31A, 31B is slid in the longitudinal direction of a vehicle, the front wheels 9 can be steered.

14 Claims, 3 Drawing Sheets

STEERING APPARATUS

BACKGROUND OF THE INVENTION

The present invention relates to a steering apparatus used for a vehicle.

Concerning an operating element incorporated into a steering apparatus of a vehicle, a steering wheel type operating element is commonly used. However, a so-called steer-by-wire type steering apparatus has been recently developed in which an input into an operating element is detected by a sensor, a steering motor is electrically controlled according to a detection value detected by the sensor and vehicle wheels to be steered are steered. According to the development of the steer-by-wire type steering apparatus, a stick type operating element, which can be oscillated round a fulcrum of one end portion, is being watched with interest.

A steering apparatus having both the rotary steering wheel type operating element and the stick type operating element has been developed. Concerning this steering apparatus, for example, refer to Patent Document 1.

[Patent Document 1]
JP-A-8-34353

However, an operation property of the steering apparatus disclosed in Patent Document 1 is not good because a rotary steering wheel type operating element and a stick type operating element are arranged being separate from each other.

SUMMARY OF THE INVENTION

Therefore, the present invention provides a steering apparatus, the operating property of which is excellent although a plurality of operating elements are provided therein.

In order to solve the above problem, according to the first aspect of the invention, there is provided with a steering apparatus (for example, an electric steering apparatus 1 in an embodiment described later) including: a first operating element (for example, steering wheels 31A, 31B and a rotary steering wheel 41 in the embodiment described later) for steering a vehicle by rotary operation; and a second operating element (for example, steering wheels 31A, 31B and sticks 42A, 42B in the embodiment described later) for steering the vehicle by operation conducted in a longitudinal direction of the vehicle, wherein the first operating element and the second operating element are integrated with each other into one body.

According to the above structure, it is possible to steer a vehicle by operating any of the first operating element and the second operating element. Further, since the first and the second operating element are integrated with each other, these operating elements can be arranged close to each other.

According to the second aspect of the invention, there is provided with the steering apparatus according to the first aspect, wherein the first and the second operating element have two arc portions (for example, arc portions 32 in an embodiment described later) common between thereof, the first operating element (for example, steering wheels 31A, 31B in the embodiment described later) rotates the arc portions, and the second operating element (for example, steering wheels 31A, 31B in the embodiment described later) operates the arc portions in the longitudinal direction.

Due to the above structure, it is possible for an operator to conduct operation without shifting the operator's hand from one operating element to the other.

According to the third aspect of the invention, there is provided with the steering apparatus according to the second aspect, wherein a rotary shaft (for example, a steering shaft 2 in an embodiment described later) of the first operating element is inclined downward as the rotary shaft comes to the front of the vehicle.

In the above structure, when the second operating element is operated in the longitudinal direction, the first operating element can be rotated. Therefore, it is possible to smoothly transfer the operation from operation of the second operating element to the operation of the first operating element.

According to the forth aspect of the invention, there is provided with the steering apparatus according to the first aspect, further including: a clutch (for example, a clutch 25 in an embodiment described later) for mechanically connecting the first operating element with wheels and disconnecting the first operating element from the wheels, wherein the clutch is disconnected while the second operating element is conducting a steering operation.

Due to the above structure, while the second operating element is being operated, the operation of the first operating element can be made invalid.

According to the fifth aspect of the invention, there is provided with the steering apparatus according to the first aspect, wherein the first operating element (for example, a rotary steering wheel 41 in an embodiment described later) is formed into a substantial arc-shape, one portion of which is cut out, and the second operating element (for example, sticks 42A, 42B in the embodiment described later) is arranged in the cutout portion of the first operating element and attached to the first operating element being capable of oscillating.

Due to the above structure, the first and the second operating element can be arranged very close to each other.

According to the invention described in the first aspect, even when any of the first and the second operating element is operated, it is possible to steer a vehicle. Further, since the first and the second operating element can be arranged close to each other, when a driver shifts the hand from one operating element to the other, a moving distance of the hand can be decreased. Therefore, the operation property can be enhanced.

According to the invention described in the second aspect, the driver can operate without shifting the hand from one operating element to the other. Therefore, the operation property can be greatly enhanced.

According to the invention described in the third aspect, the operation can be smoothly transferred from the operation of the second operating element to the operation of the first operating element. Therefore, the operation property can be greatly enhanced.

According to the invention described in the forth aspect, while the second operating element is being operated, operation of the first operating element can be made invalid. Therefore, the occurrence of interference of operation can be prevented.

According to the invention described in the fifth aspect, since the first and the second operating element can be arranged very close to each other, when a driver shifts the hand from one operating element to the other, a moving distance of the hand can be decreased. Therefore, the operation property can be enhanced.

DETAILED DESCRIPTION OF THE PREFERRED EMBODIMENTS

Referring to FIGS. 1 to 5, embodiments of the steering apparatus of the present invention will be explained below. In this connection, in the following embodiments, the present invention is applied to an electric steering apparatus of a vehicle.

First of all, Embodiment 1 of the present invention will be explained referring to FIGS. 1 to 3.

Figure 1:
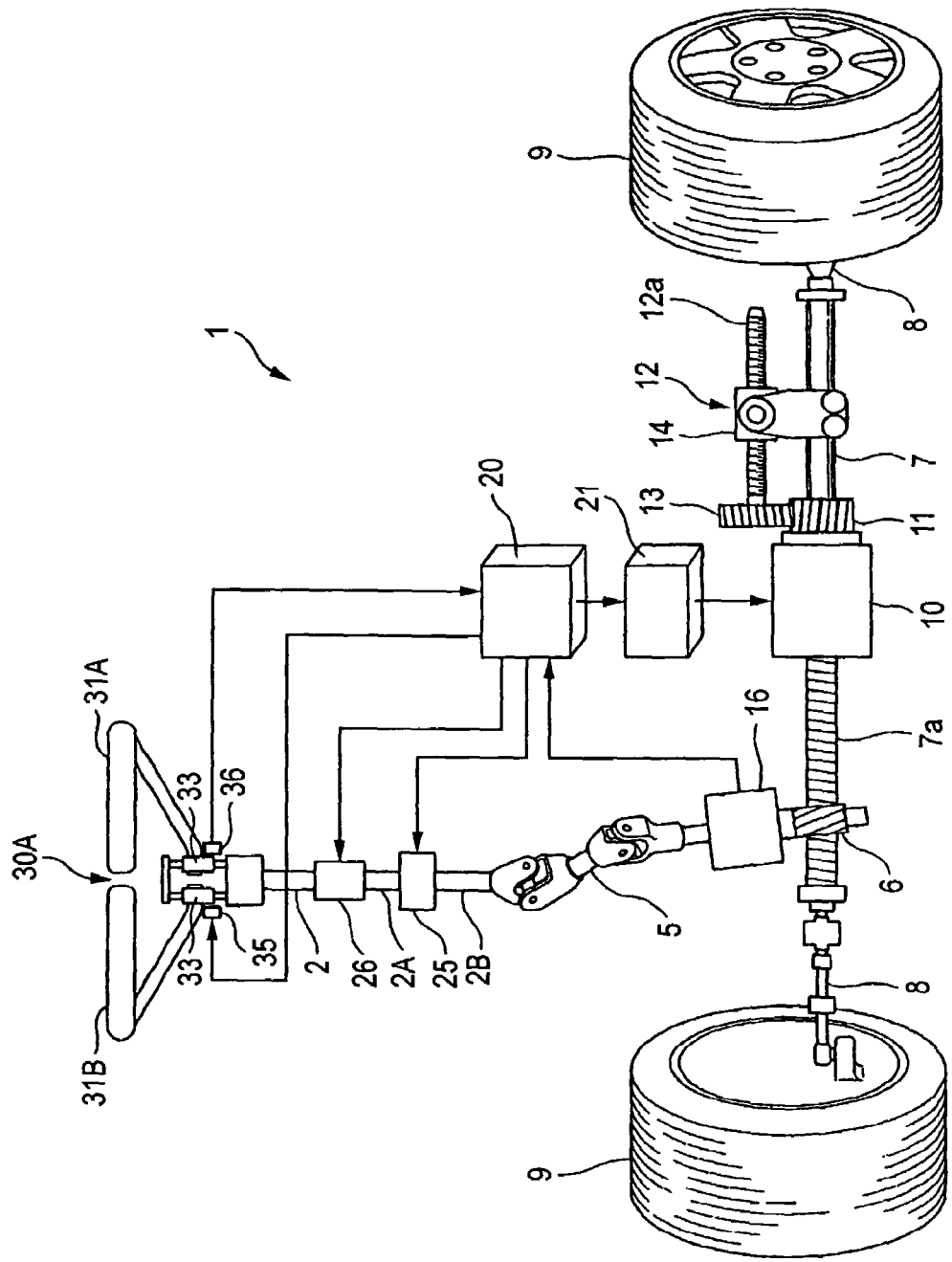
FIG. 1 is an arrangement view showing a steering device of Embodiment 1 of the present invention.

As shown in FIG. 1, an electric steering apparatus 1 includes an input device 30A on which a driver conducts an inputting operation. This input device 30A is connected to an upper end portion of a steering shaft 2.

Figure 2:
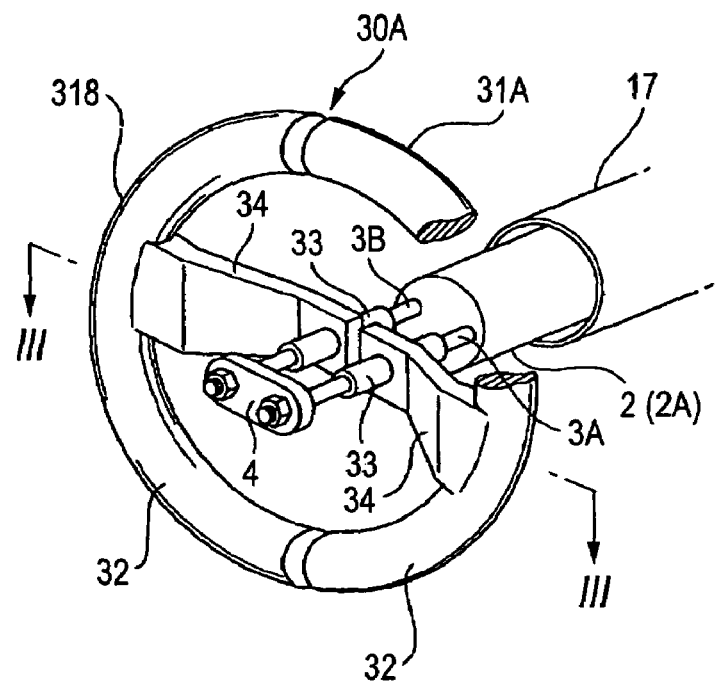
FIG. 2 is a perspective appearance view showing an input device of Embodiment 1.
Figure 3:
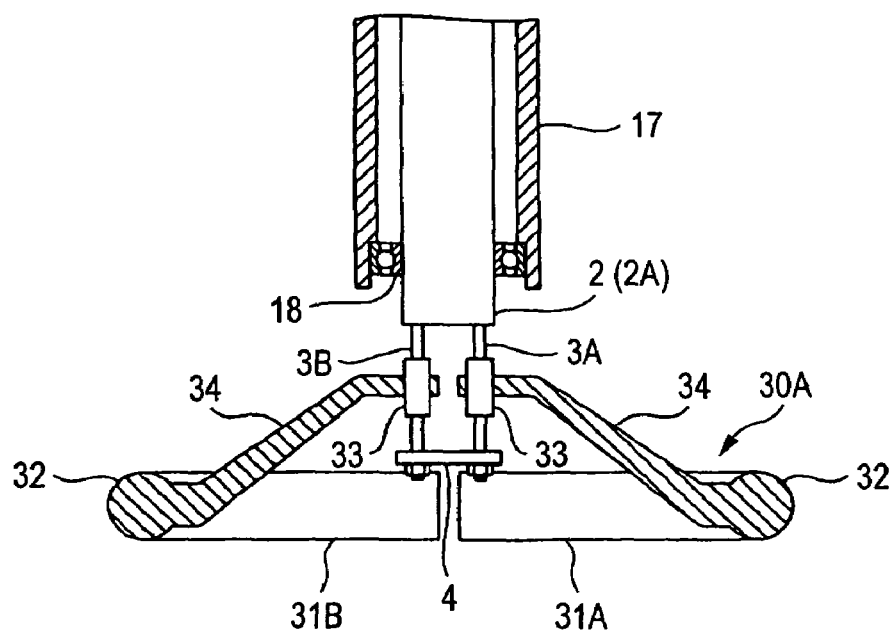
FIG. 3 is a sectional view taken on line III-III in FIG. 2.

To be in more detail, as shown in FIGS. 2 and 3, the steering shaft 2 is pivotally supported by a steering column tube 17 via a bearing 18, and a pair of guide rods 3A, 3B are extended from an upper end portion of the steering shaft 2 in the axial direction of the steering shaft 2. Steering wheels (a first operating element and a second operating element) 31A, 31B, which respectively constitute an input device 30A, are attached to the pair of guide rods 3A, 3B.

The steering wheels 31A, 31B are respectively formed into shapes which are symmetrical to each other. Each steering wheel 31A, 31B includes: a substantial semicircular arc portion 32; a support cylindrical portion 33 slidably attached to the guide rod 3A, 3B capable of sliding in the axial direction; and an arm 34 for connecting the center of the arc portion 32 with the support cylindrical portion 33. Forward end portions of both guide rods 3A, 3B are connected with each other by a connection plate 4. This connection plate 4 prevents the steering wheels 31A, 31B from being disconnected from the guide rods 3A, 3B.

In this input device 30A, the steering wheels 31A, 31B can be respectively independently slid on the guide rods 3A, 3B in the axial direction. When both the steering wheels 31A, 31B are located on the same face, the two arc portions 32, 32 are formed into one virtual circle. When both the steering wheels 31A, 31B or one of the steering wheels 31A, 31B is rotated by a driver, the steering shaft 2 can be rotated. In this case, the steering shaft 2 is a rotary shaft round which the steering wheels 31A, 31B are rotated.

As shown in FIG. 1, the support cylindrical portions 33 of the steering wheels 31A, 31B are respectively independently pushed by reaction force devices (reaction force generation means) 35, 35 so that the support cylindrical portions 33 can be returned to the neutral positions (for example, the centers of the guide rods 3A, 3B in the axial direction). In other words, each reaction force generation devices 35 generates no reaction force when the support cylindrical portion 33 is located at the neutral position. However, when the support cylindrical portion 33 is displaced from the neutral position, a reaction force is generated so that the support cylindrical portion 33 can be returned to the neutral position. As a displacement of the support cylindrical portion 33 from the neutral position is increased, a strong reaction force is generated.

In this embodiment, the reaction force device 35 generates a reaction force by an electromagnetic force, and the reaction force is controlled by controlling an electric current supplied to a solenoid (not shown).

The input device 30A includes displacement sensors (means for detecting a quantity of state) 36, 36 for detecting displacements of the support cylindrical portions 33, 33 from the neutral positions. Each displacement sensor 36, 36 outputs an electric signal to the steering control unit 20 according to the detected displacement. According to the electric signal inputted from each displacement sensor 36, 36, the steering control unit 20 controls an electric current supplied to the solenoid of each reaction force device 35, 35.

In this connection, in FIG. 1, for the convenience of illustration, the reaction force device 35 is drawn on the steering wheel 31B side, and the displacement sensor 36 is drawn on the steering wheel 31A side. However, one reaction force device 35 and one displacement sensor 36 are arranged in the steering wheel 31A, and one reaction force device 35 and one displacement sensor 36 are also arranged in the steering wheel 31B.

The steering shaft 2 includes an upper shaft 2A and a lower shaft 2B which can be connected to and disconnected from each other by the clutch 25. Connection and disconnection of the clutch 25 are controlled by the steering control unit 20. When the clutch 25 is connected, the upper shaft 2A and the lower shaft 2B are connected to each other and torque can be transmitted between thereof. When the clutch 25 is disconnected, the upper shaft 2A and the lower shaft 2B are shut off from each other and torque can not be transmitted between thereof.

The electric steering device 1 includes a lock device 26 by which the upper shaft 2A is made not to rotate when a lock operation is conducted and the upper shaft 2A is made to rotate when an unlock operation is conducted. The lock and the unlock operation of the lock device 26 are controlled by the steering control unit 20.

The lower shaft 2B of the steering shaft 2 is connected to a pinion 6 of a rack and pinion mechanism via a connecting rod 5 having universal joints. The pinion 6 is meshed with rack teeth 7a of a rack shaft 7 capable of reciprocating in the vehicle width direction. At both end portions of the rack shaft 7, the right and the left front wheel 9, 9, which are wheels to be steered, are connected via tie rods 8, 8, Accordingly, when the lock device 26 is unlocked and the clutch 25 is connected, torque generated at the time of rotating the steering wheels 31A, 32B can be transmitted to the pinion 6. Due to the foregoing, it becomes possible to conduct the normal rack and pinion type steering operation, and the front wheels 9, 9 can be steered and the vehicle direction can be changed. In this structure, the rack shaft 7 and the tie rods 8, 8 constitute a steering mechanism.

In a steering gear box (not shown) for accommodating the rack and pinion mechanism (6, 7a), a steering torque sensor (steering torque detection means) 16 is provided which detects steering torque acting on the pinion 6. The steering torque sensor 16 outputs an electric signal corresponding to the detected steering torque to the steering control unit 20.

A steering motor 10 is arranged on the same axis as that of the rack shaft 7. Output torque of this steering motor 10 is converted into a thrust via a ball screw mechanism 12 provided substantially parallel with the rack shaft 7, and the thus converted thrust is made to act on the rack shaft 7. Therefore, a drive side helical gear 11 is integrally provided on the rotor of the steering motor 10 into which the rack shaft 7 is inserted. A driven side helical gear 13, which is meshed with this drive side helical gear 11, is arranged at one end portion of the screw shaft 12a of the ball screw mechanism 12 and a nut 14 of the ball screw mechanism 12 is fixed to the rack shaft 7.

This electric steering device 1 not only can steer the front wheels 9 by rotating the steering wheels 31A, 31B but also can steer the front wheels 9 by pushing and pulling the steering wheels 31A, 31B in the longitudinal direction of a vehicle.

First, explanations will be made into a case in which the front wheels 9 are steered by rotating the steering wheels 31A, 31B. When the steering control unit 20 judges that a displacement of the support cylindrical portion 33 from the neutral position is in a predetermined range in the longitudinal direction, which will be referred to as an insensitive range hereinafter, according to the output signal outputted from each sensor 36, 36, the clutch 25 is connected and the lock device 26 is unlocked.

When the steering wheels 31A, 31B are rotated in this state, torque inputted into the steering wheels 31A, 31B is transmitted from the steering shaft 2 to the pinion 6. Therefore, in the same manner as that of the usual rack and pinion type steering operation, the front wheels 9 can be steered via the rack shaft 7. At the same time, the steering control unit 20 determines an auxiliary steering force corresponding to the steering torque detected by the steering torque sensor 16 and controls an electric current, which is supplied to the steering motor 10 via the drive circuit 21, so that the steering motor 10 can output torque corresponding to the auxiliary steering force described before. Due to the foregoing, it is possible to reduce a load given to a driver when the driver rotates the steering wheels 31A, 31B so as to steer the front wheels.

Next, explanations will be made into a case in which the front wheels 9 are steered by operating the steering wheels 31A, 31B in the longitudinal direction. When the steering control unit 20 judges that a displacement of the support cylindrical portion 33 of either steering wheel 31A, 31B from the neutral position deviates from the insensitive range described before according to the signal outputted from each sensor 36, 36, the clutch 25 is disconnected and the lock device 26 is locked. When the clutch 25 is disconnected, the upper shaft 2A and the lower shaft 2B are shut off from each other and torque can not be transmitted. When the lock device 26 is locked, the steering wheels 31A, 31b can not be rotated. Accordingly, it is impossible to rotate the steering wheels 31A, 31B and steer the front wheels at this time. In other words, the rotary operation conducted on the steering wheels 31A, 31B is made invalid. Due to the foregoing, only when the steering wheels 31A, 31B are moved in the longitudinal direction, the front wheels 9 can be steered.

In this case, the steering operation is basically conducted as follows. In order to turn the vehicle to the left, the right steering wheel 31A is moved forward. Alternatively, the left steering wheel 31B is moved backward. In order to turn the vehicle to the right, the left steering wheel 31B is moved forward. Alternatively, the right steering wheel 31A is moved backward. The steering control unit 20 determines a steering direction and steering force according to an output signal outputted from each sensor 36, 36. Further, the steering control unit 20 controls an electric current supplied to the steering motor 10 via the control circuit 21 so that the torque corresponding to the thus determined steering direction and the steering force can be outputted from the steering motor 10. Due to the foregoing, the electric steering device 1 can steer the front wheels 9 as a so-called steer-by-wire type steering device. At the same time, the steering control device 20 controls an electric current supplied to the solenoid of each reaction force device 35, 35 according to the output signal outputted from each displacement sensor 36, 36, so that a reaction force can be given to the steering wheels 31A, 31B.

In this electric steering device 1, the steering wheels 31A, 31B functions as an operating element (a first operating element) for conducting rotary operation and an operating element (a second operating element) for conducting longitudinal operation. In other words, the steering wheels 31A, 31B have the first operating element for conducting rotary operation and the second operating element for conducting longitudinal operation in common. Therefore, it is unnecessary for a driver to shift the hand from one operating element to the other when the rotary operation and the longitudinal operation are conducted. Accordingly, the operation property is excellent.

When the steering wheels 31A, 31B are operated in the longitudinal direction, the clutch 25 is disconnected and the rotary operation of the steering wheels 31A, 31B is made invalid. Therefore, it is possible to prevent the occurrence of interference of the rotary operation with the longitudinal operation of the steering wheels 31A, 31B.

In this connection, when both the steering wheels 31A, 31B are simultaneously operated in the longitudinal direction, it is possible to control an electric current supplied to the steering motor 10 according to the deviation of the displacements of both the steering wheels 31A, 31B. Alternatively, it is possible to control the electric current supplied to the steering motor 10 when a larger displacement between thereof is adopted.

In this connection, in Embodiment 1 described above, the electric steering device 1 includes the clutch 25 and the lock device 26. Even when the clutch 25 and the lock device 26 are not provided in the electric steering device 1, the present invention can be established.

Figure 4:
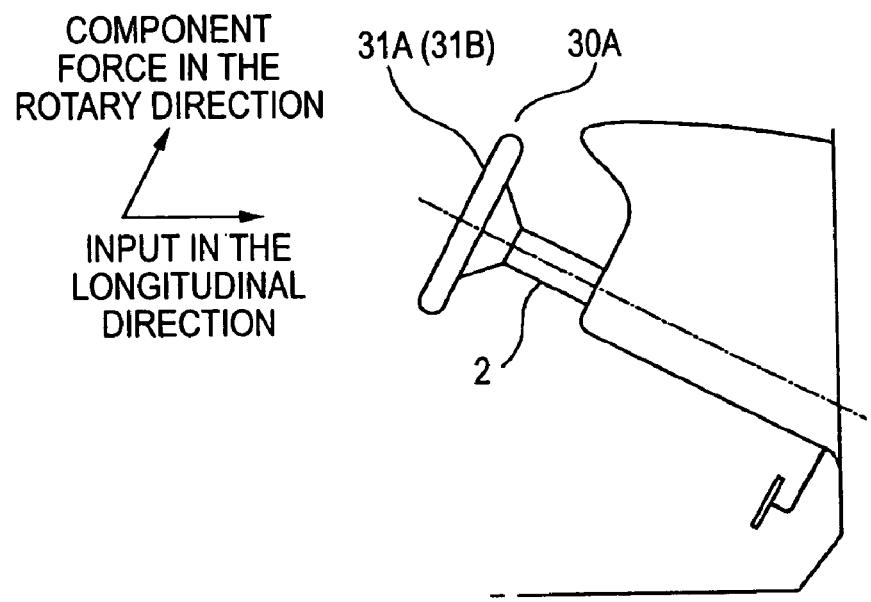
FIG. 4 is a side view showing a case in which a steering shaft is arranged being inclined in Embodiment 1.

Especially in the case where the lock mechanism 26 is not provided and the rotary operation and the longitudinal operation of the steering wheels 31A, 31B can be simultaneously conducted and the axis of the steering shaft 2 is inclined downward as it comes to the front of a vehicle as shown in FIG. 4, when the steering wheel 31A (or 31B) is pushed by giving a force to the front in the horizontal direction, a component force is generated in the rotary direction of the steering wheels 31A, 31B. Therefore, it is possible to provide an advantage that the operation in the longitudinal direction can be smoothly transferred to the operation in the rotary direction.

Next, referring to FIG. 5, Embodiment 2 of the steering device of the present invention will be explained below.

A different point of the steering device of Embodiment 2 from that of Embodiment 1 is an input device. In the input device 30A of Embodiment 1, the first operating element for rotary operation and the second operating element for longitudinal operation are formed out of the common operating element (the steering wheels 31A, 31B). However, in the input device of Embodiment 2, the first operating element exclusively used for rotary operation and the second operating element exclusively used for longitudinal operation are provided being separate from each other.

Figure 5:
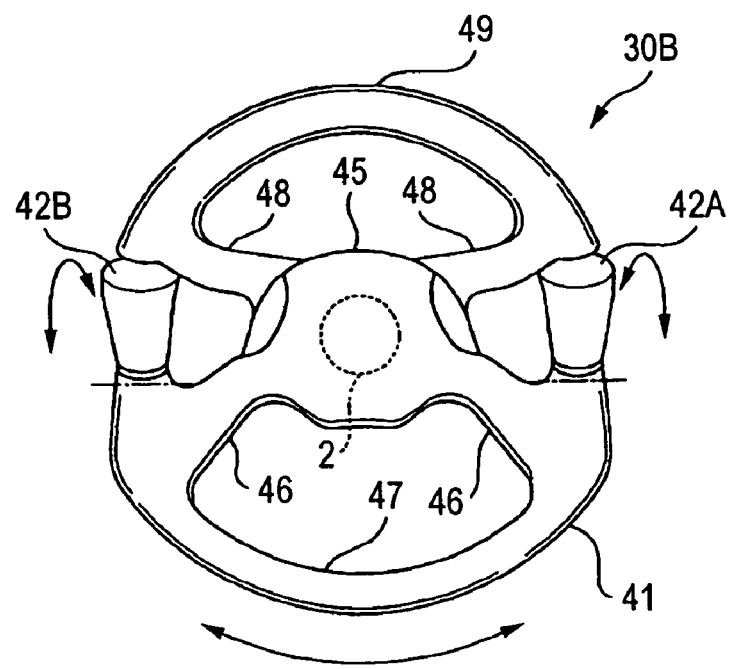
FIG. 5 is a front view showing an input device of the steering device of Embodiment 2 of the present invention.

Referring to FIG. 5, explanations will be made into the input device 30B of the electric steering device 1 in Embodiment 2. In this connection, points of the structure of Embodiment 2 except for the input device 30B are the same as those of Embodiment 1. Therefore, the explanations are omitted here.

The input device 30B includes: a rotary steering wheel 41 which is a first operating element; and a pair of sticks 42A, 42B which are a second operating element.

The rotary steering wheel 41 includes: a center core portion 45 constituting a connecting portion with the steering shaft 2; a first arc portion 47 arranged outside the center core portion 45, formed into a substantial semi-arc shape on a side close to a driver, connected to the center core portion 45 via an arm portion 46; and a second arc portion 49 arranged outside the center core portion 45, formed into a substantial semi-arc shape on a side distant from the driver, connected to the center core portion 45 via an arm portion 48. The first arc portion 47 and the second arc portion 49 are arranged on the same plane, and both end portions of the first arc portion 47 and both end portions of the second arc portion 49 are arranged being opposed to each other while leaving a predetermined interval between thereof.

The rotary steering wheel 41 is connected to an upper end portion of the steering shaft 2 and rotated integrally with the steering shaft 2. Accordingly, when the rotary steering wheel 41 is operated being rotated, the front wheels 9 can be steered.

Sticks 42A, 42B are arranged at end portions of the first arc portion 47 of. the rotary steering wheel 41. Forward end portions of the sticks 42A, 42B are extended toward the end portions of the second arc portion 49, and the sticks 42A, 42B are attached to the end portions of the first arc portion 47 being capable of oscillating in the longitudinal direction of the vehicle round the fulcrum of the base portion.

The rotary steering wheel 41 is formed into a substantial arc shape, two portions of which are cut out, that is, two portions between the end portions of the first arc portion 47 and the end portions of the second arc portion 49 are cut out. The sticks 42A, 42B are attached to the cutout portions of the rotary steering wheel 41.

The sticks 42A, 42B are respectively provided with an angle sensor and a reaction force sensor which are omitted in the drawing. The angle sensor detects an oscillation angle of the oscillation from the neutral position of the stick 42A, 42B and outputs an electric signal, which corresponds to the detected oscillation angle, to the steering control unit 20. The function of the reaction force device of Embodiment 2 is the same as that of the reaction force device 35 of Embodiment 1. When the stick 42A, 42B is located at the neutral position, no reaction force is generated. However, when the stick 42A, 42B is tilted from the neutral position in the longitudinal direction, a reaction force to return to the neutral position is generated. As a displacement from the neutral position is increased, a strong reaction force is generated.

In the electric steering device 1 of Embodiment 2, when the stick 42A, 42B is oscillated in the longitudinal direction, the front wheels 9 can be steered.

In this case, operation is basically conducted as follows. In order to turn a vehicle to the left, the right stick 42A is tiled to the front of the vehicle. Alternatively, the left stick 42B is tiled to the rear of the vehicle. In order to turn the vehicle to the right, the left stick 42B is tiled to the front of the vehicle. Alternatively, the right stick 42A is tiled to the rear of the vehicle. The steering control unit 20 determines a steering direction and a steering force according to the output signal outputted from each angle sensor and controls an electric current supplied to the steering motor 10 via the drive circuit 21 so that the steering motor 10 can output torque corresponding to the thus determined steering direction and steering force. Due to the foregoing, the electric steering device 1 can steer the front wheels 9 as a so-called steer-by-wire type steering device. At the same time, the steering control unit 20 controls each reaction force device according to the output signal outputted from each angle sensor and gives a reaction force to the stick 42A, 42B.

In the electric steering device 1 of Embodiment 2, the rotary steering wheel 41 exclusively used for rotary operation and the sticks 42A, 42B exclusively used for longitudinal operation are arranged separately from each other. However, since the rotary steering wheel 41 and the sticks 42A, 42B are arranged very close to each other, when a driver shifts the hand between the rotary steering wheel and the sticks 42A, 42B, a moving distance of the hand can be greatly decreased. Therefore, the operation property can be enhanced.

In this connection, the present invention is not limited to the embodiments described above. It is possible to apply the present invention to a steering device of a moving body except for a vehicle.

What is claimed is:

1. A steering apparatus comprising:
    a first operating element rotatable around an axis, said first operating element being adapted to steer a vehicle by rotary operation; and
    a second operating element movable in a longitudinal direction of the vehicle, said second operating element being adapted to steer the vehicle by operation conducted in the longitudinal direction of the vehicle, wherein
    the first operating element and the second operating element are integrated with each other into one body, and
    wherein when the first operating element is operated, movement of the second operating element in the longitudinal direction is disabled, and when the second operating element is operated, rotary operation of the first operating element is disabled.

2. The steering apparatus according to claim 1, comprising:
    a first arc portion; and
    a second arc portion,
    wherein the first and second arc portions cooperate to define a circle and are spaced from one another at opposite sides of the circle, wherein
    the first operating element rotates the first and second arc portions while the arc portions define the circle, and
    the second operating element operates the arc portions in the longitudinal direction so as to displace one of the first and second arc portions in the longitudinal direction relative to the other of the first and second arc portions.

3. The steering apparatus according to claim 2, wherein a rotary shaft of the first operating element is inclined downward as the rotary shaft comes to the front of the vehicle.

4. The steering apparatus according to claim 1, further comprising:
    a clutch that mechanically connects the first operating element with wheels and disconnects the first operating element from the wheels, wherein
    the clutch is disconnected while the second operating element is conducting a steering operation.

5. The steering apparatus according to claim 1, wherein
    the first operating element is formed into a substantial arc-shape, one portion of which is cut out, and
    the second operating element is arranged in the cutout portion of the first operating element and attached to the first operating element being capable of oscillating.

6. The steering apparatus according to claim 4, further comprising:
    a lock connected to the body, wherein said lock disables rotary operation of the body according to the first operating element when the clutch disconnects the first operating element from the wheels.

7. The steering apparatus according to claim 2, further comprising:
    a steering shaft;
    a first guide rod; and
    a second guide rod,
    wherein said first guide rod operably connects the first arc portion to the steering shaft and said second guide rod operably connects the second arc portion to the steering shaft, and the first and second guide rods are slidably attached to the steering shaft so as to be slidably movable in the longitudinal direction when the second operating element is operated and are fixedly attached to the steering shaft when the first operating element is operated.

8. The steering apparatus according to claim 7, further comprising:

a steering control unit; and a displacement sensor disposed adjacent to said first and second guide rods and connected to said steering control unit, wherein said displacement sensor detects a longitudinal movement by one of the first and second arc portions and outputs a signal to the steering control unit to steer the vehicle based on the detected longitudinal movement.

9. The steering apparatus according to claim 8, further comprising:

a clutch that mechanically connects the first operating element with wheels and disconnects the first operating element from the wheels, wherein the clutch is connected to the steering control unit and the steering control unit signals the clutch to disconnect the first operating element from the wheels when the displacement sensor outputs the signal to the steering control unit indicating that second operating element is conducting a steering operation.

10. The steering apparatus according to claim 9, further comprising:

a lock connected to the first operating element, wherein said lock disables rotary operation of the first operating element when the clutch disconnects the first operating element from the wheels.

11. A steering apparatus for steering a vehicle, comprising:

an input device mounted on a steering shaft, said input device being movable in one of a first rotary motion about said steering shaft and a second longitudinal motion relative to said steering shaft;

an input sensor for detecting said second longitudinal motion;

a mechanical steering mechanism selectively connecting said steering shaft with vehicle wheels;

a steering control unit; and a steering motor, wherein said mechanical steering mechanism connects said steering shaft with vehicle wheels when the input device is moved in the first rotary direction, said mechanical steering mechanism steering the vehicle according to the rotary motion of the input device, and wherein said input sensor, steering control unit, and steering motor are connected with one another, and said steering control unit translates the second longitudinal motion of the input device into a command sent to the steering motor, wherein the steering motor steers the vehicle according to said command.

12. The steering apparatus according to claim 11, wherein said mechanical steering device includes a steering torque sensor, said steering torque sensor sending a signal corresponding to a detected steering torque to the steering control unit, wherein said steering control unit sends a command to the steering motor instructing the steering motor to provide an auxiliary steering force, and said steering motor provides said auxiliary steering force.

13. The steering apparatus according to claim 11, wherein the mechanical steering mechanism is a rack and pinion steering system.

14. The steering apparatus according to claim 12, wherein the mechanical steering mechanism is a rack and pinion steering system.

* * * * *